Sept. 4, 1928.
J. W. HOWELL
BEARING PULLER
Filed April 23, 1927
1,683,189
2 Sheets-Sheet 1
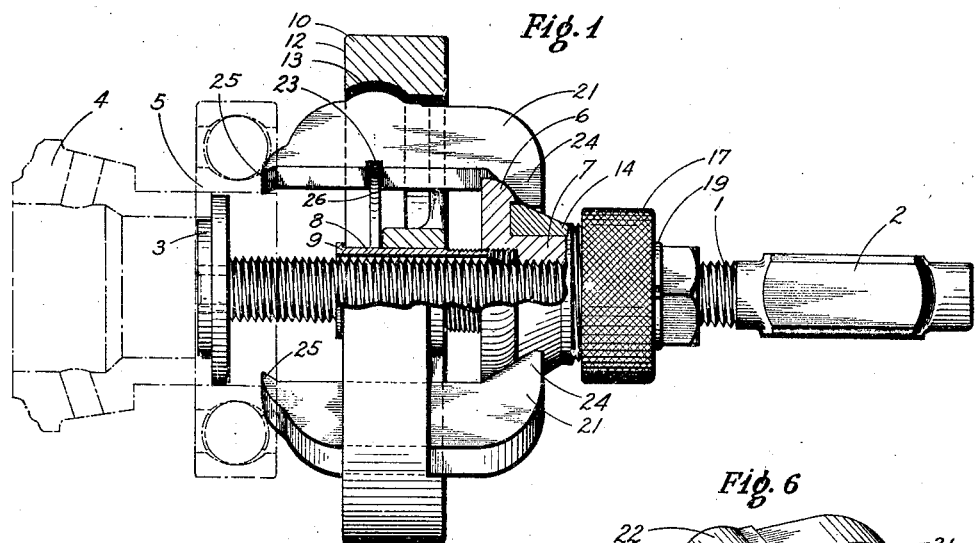
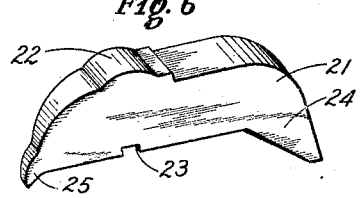
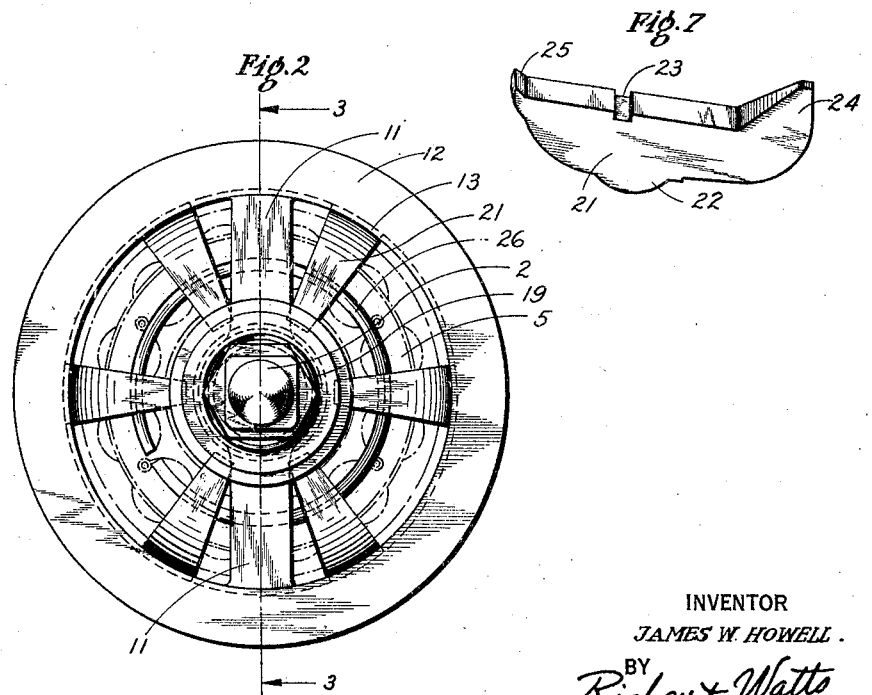
INVENTOR
JAMES W. HOWELL.
BY
Richey & Watts
ATTORNEYS Sept. 4, 1928.
J. W. HOWELL
1,683,189
BEARING PULLER
Filed April 23, 1927
2 Sheets-Sheet 2
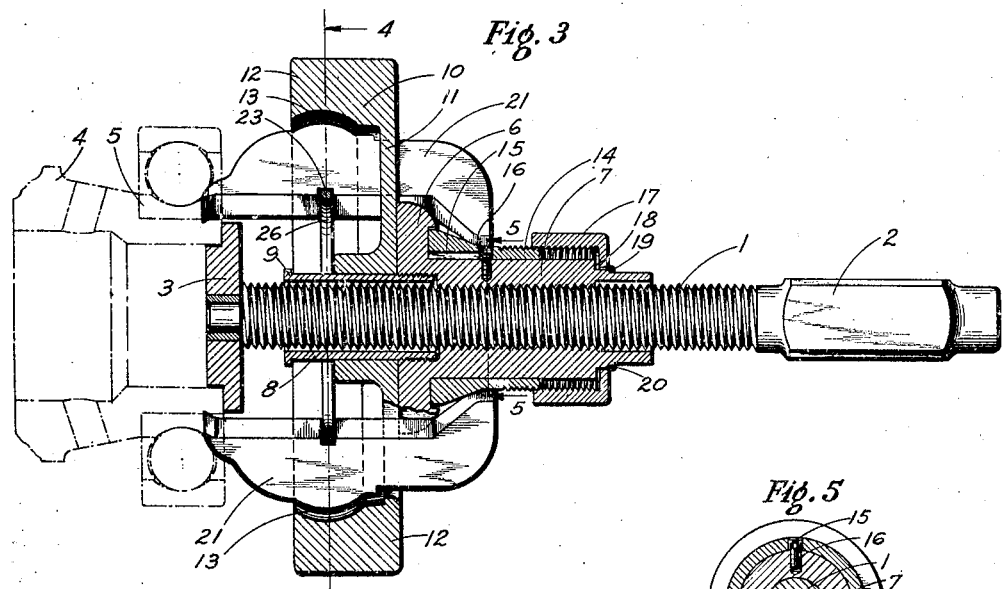
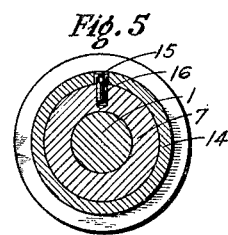
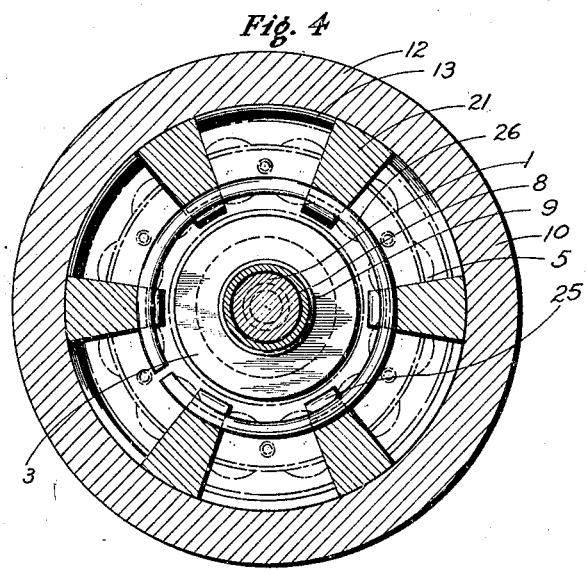
INVENTOR
JAMES W. HOWELL.
BY
ATTORNEYS Patented Sept. 4, 1928.

1,683,189

UNITED STATES PATENT OFFICE.

JAMES W. HOWELL, OF CLEVELAND, OHIO, ASSIGNOR TO THE WHITE MOTOR COMPANY, OF CLEVELAND, OHIO, A CORPORATION OF OHIO.

BEARING PULLER.

Application filed April 23, 1927. Serial No. 185,932.

This invention relates to tools such as are used for removing bearings and like parts, which must be moved longitudinally along their supports and against considerable resistance.

It is particularly applicable to the removal of bearings which are so situated that access to the rear surface thereof is obstructed or in which the force necessary to remove the bearing must be applied to the inner race.

Heretofore much difficulty has been experienced in removing bearings of the types referred to, and it has frequently been necessary to dismantle or disassemble large portions of the apparatus on which these are employed for the sole purpose of removing the bearings.

By applications of my invention, bearings in many inaccessible places may be removed, it being only necessary to have access to the front or outer face of the bearings.

The invention will be better understood from the description of one practical embodiment thereof illustrated in the accompanying drawings in which:—

Fig. 1 is a side elevation of one form of apparatus embodying my invention, parts being broken away, the parts being in the position they occupy when extracting the inner race of a ball bearing.

Fig. 2 is an end elevation taken from the front or outer end thereof.

Fig. 3 is a central longitudinal section thereof, partly broken away, showing the parts in the position they occupy while being brought into engagement with the inner race of a ball bearing.

Fig. 4 is a transverse sectional view on the line IV—IV of Fig. 3.

Fig. 5 is a fragmentary transverse sectional view on the line V—V of Fig. 3, and Figs. 6 and 7 are perspective views of the gripping arms illustrated in the preceding figures.

The tool comprises, in general, a screw or the like for exerting longitudinal pressure to remove an object from its support and a chuck for engaging and gripping the object to effect its removal. The term chuck is used hereinafter not only to indicate the particular chuck shown, but also to include any device having gripping elements or jaws which hold an object by being contracted to exert inward pressure upon an exterior surface of the object.

A screw is illustrated at 1, having at its outer end a head 2 adapted to be engaged by a wrench, or the like, and journaled on its inner end an abutting washer 3 for contacting the end of a tubular support 4 from which a ball-bearing having an inner race 5 is to be removed. Threaded upon the screw is a travelling nut consisting of an enlarged head 6 and cylindrical shank 7 which is caused to move axially of the screw when the latter is rotated. Threaded to the inner end of the nut is a tubular extension or bushing 8 having at its inner extremity a peripheral flange 9.

Rotatable and slidable upon this bushing is a hub 10 of a wheel-like arm-retainer which comprises in addition to the hub, two spokes 11 and a peripheral rim or ring 12. The inner surface of the ring 12 is provided with a curved annular groove 13 for a purpose to be hereinafter described.

Upon the cylindrical shank of the nut is slidably mounted a sleeve 14, the outer end of which is cylindrical and externally threaded, and the inner end of which is of substantially frustro-conical shape, increasing in diameter toward the flange 6. A key-way 15 is cut in the inner surface of this sleeve so that it will slide over a small screw 16 threaded into the shank of the nut to retain the sleeve from rotative movement relative the shank.

An internally threaded cap 17 engages the thread of the sleeve, the cap being provided with an inwardly directed peripheral flange engaging a shoulder 18 on the nut near its outer end and retained adjacent the shoulder by a ring 19 seated on a cylindrical protection 20 which forms the outer end of the nut. This cap is knurled so that it may be readily adjusted by hand without the use of tools and so locate the sleeve at any desired point along the shank of the nut.

Bearing on the groove within the retaining ring 12 are a plurality of gripping arms 21. These arms are each formed, as best shown in Figs. 6 and 7, with an arcuate projection 22 on its outer surface intermediate its ends and a notch or groove 23 in its inner surface in substantially transverse alignment with the center of the arcuate surface. The outer end of the arm is offset to form a lug or projection 24 adapted to be engaged by the frustro-conical part of sleeve 14, or by the curved surface of the flange 6 of the nut. The inner end of the arm is provided with a thin hook-like jaw 25 adapted to reach between or under the bearing balls and to engage the concave surface of the inner race of the bearing.

The arms are positioned within the retaining ring and a split spring ring 26 is sprung into the grooves 23. The tension of this ring holds the arms against the retaining ring so that projections 22 fit within the annular groove 13 and constitute bearings upon which the arms may rock longitudinally of the tool.

The operation of the tool is as follows:

The cap 17 is rotated to move sleeve 14 against flange 6. The screw 1 is rotated to move a washer 3 toward the nut. The tool is now placed as shown in Fig. 3 with the washer abutting the end of the support 4, and the jaws 25 of the gripping arms engaging the inner surface of the inner race 5 of the ball bearing. When the parts are in this position, the operator rotates the cap 17 and so retracts sleeve 14 until the frustro-conical surface thereof engages the lugs 24 at the ends of the gripping arms and wedges these lugs outwardly, causing the jaws to take a firm grip upon the ball race. The operator now rotates screw 1, by means of a wrench engaging the head thereof, to move washer 3 away from the nut. This operation causes flange 6 carried by the nut to engage the projections 24 of the gripping arms and this pressure tends both to cause the arms to grip the ball race more firmly and to pull the race toward the right, as shown in the drawing, sliding it off the support 4 as illustrated in Fig. 1.

It will readily be seen that the tool provides a conveniently operated means for firmly gripping and withdrawing the ball race 5, although only the outer face thereof be exposed, and which is prevented from slipping off the race due to pressure of flange 6 upon the arms which pressure tends to pull the race from its support, and at the same time causes the gripping arms to grasp the race more tightly as the pressure is increased.

While I have described the illustrated embodiment of my invention in some particularity, this embodiment is shown by way of illustration only and not by way of limitation, and I do not therefore confine myself to the precise details shown and described, but claim as my invention all embodiments thereof coming within the scope of the appended claims.

I claim:

1. A tool comprising a chuck having a plurality of gripping jaws, cam-means for causing the jaws to exert gripping pressure on an object, a longitudinally movable pressure-exerting element engageable with the support of the object, and a second cam-means carried by said element causing the jaws to exert additional gripping pressure on the object when said element exerts pressure between the object and its support.

2. A tool comprising a plurality of gripping arms, a retainer preventing radial displacement of an intermediate part of each arm, a gripping jaw at one end of each arm, cam means engaging the other end of each arm, and a longitudinal-pressure-exerting element carrying the cam-means and operable to exert pressure between an object and its support and to simultaneously cause the cam means to contract the jaws.

3. A tool comprising a chuck having a plurality of gripping jaws, a ring surrounding the arms and with which they are in pivotal contact, a spring retaining the arms in contact with said ring, a screw for exerting longitudinal pressure upon the end of a shaft from which it is desired to remove articles, a nut threaded on said screw, and a tapered surface on said nut having its largest diameter toward the end of said screw which bears upon the shaft engaging the outer end of said arms.

In testimony whereof I hereunto affix my signature April 18, 1927.

JAMES W. HOWELL.